United States Patent
Acker et al.

(10) Patent No.: US 11,451,288 B2
(45) Date of Patent: Sep. 20, 2022

(54) CONTROL OF ANTENNA STEERING OF A WIRELESS DEVICE

(71) Applicant: Skylo Technologies, Inc., Palo Alto, CA (US)

(72) Inventors: Christopher Acker, San Mateo, CA (US); Meghna Agrawal, Cupertino, CA (US); Andrew Nuttall, Mountain View, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 317 days.

(21) Appl. No.: 16/922,252

(22) Filed: Jul. 7, 2020

(65) Prior Publication Data
US 2022/0014255 A1    Jan. 13, 2022

(51) Int. Cl.
*H04B 7/08* (2006.01)
*H04W 24/08* (2009.01)
*H04B 7/0404* (2017.01)

(52) U.S. Cl.
CPC .......... *H04B 7/088* (2013.01); *H04B 7/0404* (2013.01); *H04W 24/08* (2013.01)

(58) Field of Classification Search
CPC .. H04B 7/0695; H04B 7/0408; H04B 17/318; H04B 7/0617; H04B 7/088; H04B 7/024; H04B 7/063; H04B 7/0413; H04B 7/0456; H04B 7/0689; H04B 17/309; H04B 7/0691; H04B 17/102; H04B 7/0465; H04B 7/0874; H04B 7/0417; H04B 7/0626

USPC .......................................................... 455/130
See application file for complete search history.

(56) References Cited

U.S. PATENT DOCUMENTS

| 7,391,381 | B2 | 6/2008 | Wang et al. |
| 8,331,329 | B2 | 12/2012 | Sayegh |
| 9,318,794 | B2 | 4/2016 | Chang et al. |
| 2013/0040682 | A1* | 2/2013 | Chang ............ H04W 24/10 342/368 |
| 2018/0115958 | A1* | 4/2018 | Raghavan ........ H04B 7/0697 |

* cited by examiner

*Primary Examiner* — Ajibola A Akinyemi
(74) *Attorney, Agent, or Firm* — Brian R. Short

(57) ABSTRACT

Apparatuses, methods, and systems for control of antenna steering of a wireless device, are disclosed. One method includes selecting beamforming direction settings of a multiple antenna array of a radio, retrieving spatial relationships between each of different beamforming directions, receiving, by the radio, a wireless signal from a base station and measuring signal metrics of the wireless signal, sensing motion of the wireless device, identifying a wireless connection direction for establishing a wireless connection with the base station based on the signal metrics, the plurality of beamforming direction settings used while receiving the wireless signal, and an orientation of the wireless device determined based on the sensed motion of the wireless device, and selecting a one of the plurality of beamforming direction settings for communicating with the base station based on the wireless connection direction, a beamforming setting that corresponds with the wireless connection.

20 Claims, 9 Drawing Sheets

```
┌─────────────────────────────────────────────────────────────────────────────┐
│  Selecting at least one of a plurality of beamforming direction settings of a multiple antenna │
│                       array of a radio of a wireless device                 │
│                                      410                                    │
└─────────────────────────────────────────────────────────────────────────────┘
                                       ▼
┌─────────────────────────────────────────────────────────────────────────────┐
│  Retrieving spatial relationships between each of different beamforming directions of the │
│                  plurality of beamforming direction settings                │
│                                      420                                    │
└─────────────────────────────────────────────────────────────────────────────┘
                                       ▼
┌─────────────────────────────────────────────────────────────────────────────┐
│  Receiving, by the radio of the wireless device, a wireless signal from a base station and │
│              measuring one or more signal metrics of the wireless signal    │
│                                      430                                    │
└─────────────────────────────────────────────────────────────────────────────┘
                                       ▼
┌─────────────────────────────────────────────────────────────────────────────┐
│                       Sensing motion of the wireless device                 │
│                                      440                                    │
└─────────────────────────────────────────────────────────────────────────────┘
                                       ▼
┌─────────────────────────────────────────────────────────────────────────────┐
│ Identifying a wireless connection direction for establishing a wireless connection with the base │
│ station based on the one or more signal metrics, the at least one of the plurality of beamforming │
│ direction settings used while receiving the wireless signal, and an orientation of the wireless │
│           device determined based on the sensed motion of the wireless device │
│                                      450                                    │
└─────────────────────────────────────────────────────────────────────────────┘
                                       ▼
┌─────────────────────────────────────────────────────────────────────────────┐
│ Selecting a one of the plurality of beamforming direction settings for communicating with the │
│ base station based on the wireless connection direction, a one of the plurality of beamforming │
│ settings that corresponds with the wireless connection direction, and the sensed motion of the │
│                               wireless device                               │
│                                      460                                    │
└─────────────────────────────────────────────────────────────────────────────┘
```

Figure 4

CONTROL OF ANTENNA STEERING OF A WIRELESS DEVICE

FIELD OF THE DESCRIBED EMBODIMENTS

The described embodiments relate generally to wireless communications. More particularly, the described embodiments relate to systems, methods and apparatuses for control of antenna steering of a wireless device.

BACKGROUND

Wireless communication includes transmission and reception of electromagnetic signals. The electromagnetic signals are communicated through the air using one or more antennas. The one or more antennas operate to form omnidirectional or directional beamforming patterns. Omnidirectional antenna patterns operate over many directions simultaneously while directional beamforming antenna patterns operate over a relatively narrow range of directions. Omnidirectional beamforming patterns generally support wireless communication over shorter distances than directional beamforming patterns. Further, due to the focusing of the electromagnetic energy, directional beamforming patterns generally provide for greater communicated signal energy than omnidirectional beamforming patterns.

For some applications, such as, satellite communication, wireless communication can be better supported by directional beamforming patterns. However, maintaining a beam of a directional beamforming antenna of a mobile device can be challenging due to the effects of the motion of the mobile device on the direction of the beam.

It is desirable to have methods, apparatuses, and systems for control of antenna steering of a wireless device.

SUMMARY

An embodiment includes a method. The method includes selecting at least one of a plurality of beamforming direction settings of a multiple antenna array of a radio of a wireless device, retrieving spatial relationships between each of different beamforming directions of the plurality of beamforming direction settings, receiving, by the radio of the wireless device, a wireless signal from a base station and measuring one or more signal metrics of the wireless signal, sensing motion of the wireless device, identifying a wireless connection direction for establishing a wireless connection with the base station based on the one or more signal metrics, the at least one of the plurality of beamforming direction settings used while receiving the wireless signal, and an orientation of the wireless device determined based on the sensed motion of the wireless device, and selecting a one of the plurality of beamforming direction settings for communicating with the base station based on the wireless connection direction, a one of the plurality of beamforming settings that corresponds with the wireless connection.

Another embodiment includes a wireless device. The wireless device includes a radio, one or more motion sensors, and a controller. A multiple antenna array of the radio is operative to form beams for facilitating a wireless connection to a base station. The controller is operative to select at least one of a plurality of beamforming direction settings of the multiple antenna array of the radio of the wireless device, and retrieve spatial relationships between each of different beamforming directions of the plurality of beamforming direction settings. The radio further operates to receive a wireless signal from the base station and measure one or more signal metrics of the wireless signal. The one or more motion sensors operate to sense motion of the wireless device. The controller is further operative to identify a wireless connection direction for establishing the wireless connection with the base station based on the one or more signal metrics, the at least one of a plurality of beamforming direction settings used while receiving the wireless signal, and an orientation of the wireless device determine based on the sensed motion of the wireless device, and select a one of the plurality of beamforming direction settings for communicating with the base station based on the wireless connection direction, a one of the plurality of beamforming settings that corresponds with the wireless connection direction, and the sensed motion of the wireless device.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a flow chart that includes steps of a method of control of antenna steering of a wireless device, according to an embodiment.

DETAILED DESCRIPTION

Figure 1:
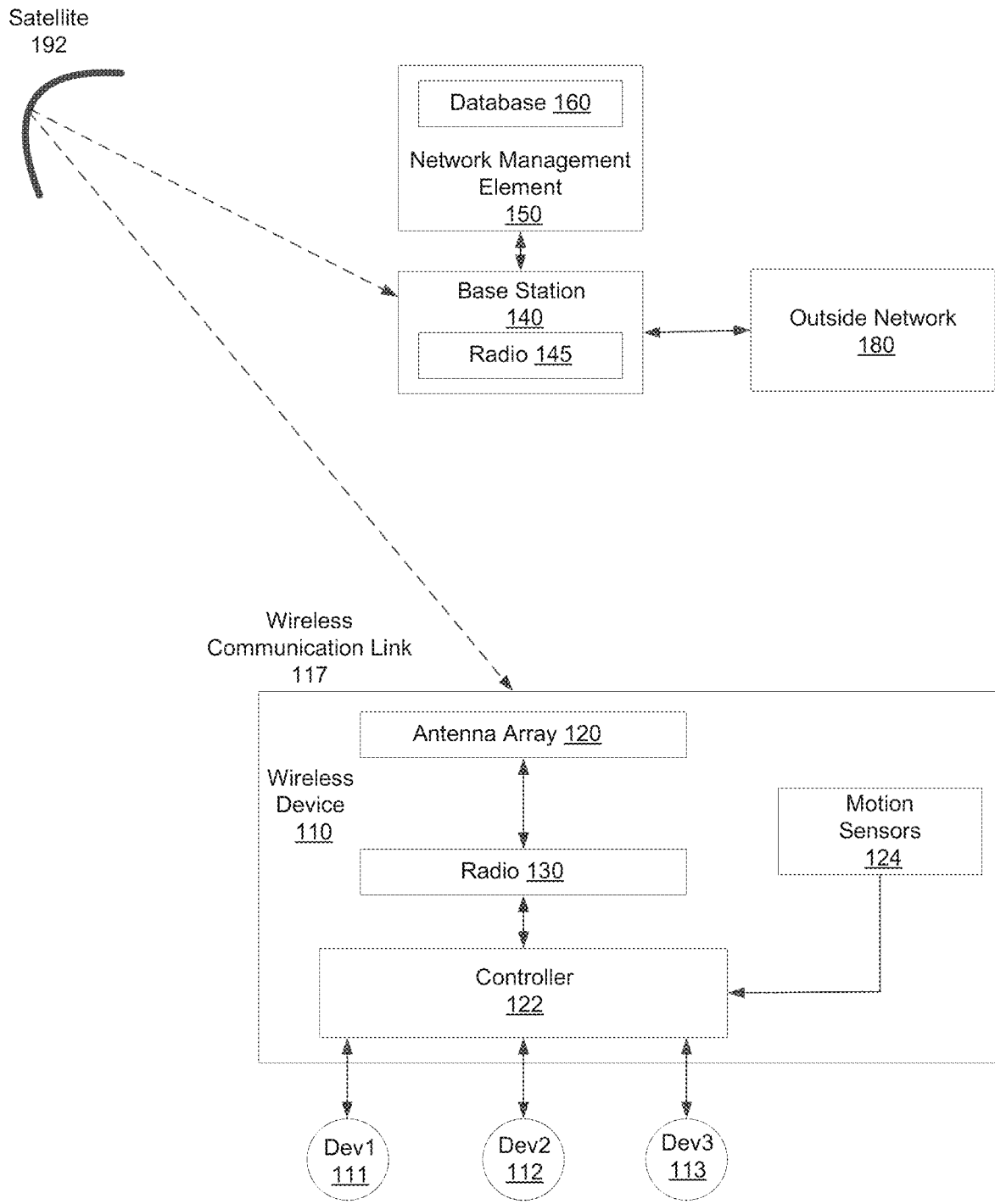
FIG. 1 shows a wireless device operating to communicate with a base station through a satellite, according to an embodiment.

The embodiments described include methods, apparatuses, and systems for control of antenna steering (antenna beam direction selection) of a wireless device. For at least some embodiments, motion of the wireless device is sensed. Further, the sensed motion is used to update a direction of an antenna-formed beam used for communicating wireless signals. Further, at least some embodiments use one or more measured metrics of wireless signals for determining a direction of a satellite. For at least some embodiments, the updated antenna direction is selected based on the determined direction of the satellite and based on the sensed motion of the wireless device.

At least some embodiments include beam steering of a direction beam formed by an antenna array of the wireless device. For an embodiment, the beam steering utilizes a received wireless signal metric (such as, RSSI (receive signal strength indicator)) measured during a scan of possible beamforming patterns to establish a direction of a wireless link to a base station through a satellite. For an embodiment, the beam steering utilizes the received wireless signal metric measured while the wireless device is experiencing motion to establish the direction of the wireless link. For an embodiment, the beam steering utilizes the received wireless signal metric measured while the wireless device is scanning through the possible beamforming patterns and/or while the wireless device is experiencing motion, to determine the direction of the wireless link.

For at least some embodiments, the determined direction of the wireless link provides a beamforming pattern (beam direction) and an associated orientation of the wireless device that can be used along with the sensed motion to select a new or a current beamforming pattern selection. An embodiment includes repeatedly determining the direction of the wireless link over time. For an embodiment, the direction of the wireless link determination is periodic. For an embodiment, the direction of the wireless link determination is triggered. For an embodiment, the direction of the wireless link is continuously updated as new measured metric and motion information is received.

For an embodiment, the motion sensors include an IMU (inertial measurement unit). For a specific embodiment, the motion sensors include a 6-axis IMU. For an embodiment, the measured wireless signal metric includes an RSSI measurement, wherein the RSSI measurement closes a loop of an open loop 6-axis IMU beamforming steering control. An alternate embodiment utilizes a magnetometer to close this loop. However, the use of a magnetometer can be undesirable. It is to be realized that the described embodiments that use RSSI measurements to close the loop are applicable under a unique set of circumstances. Specifically, the described embodiments are operable if the distance between the transmitter and receiver is large enough such that motion of the receiver does not change (that is, changes less than a threshold) the angular orientation between the transmitter and receiver. That is, for example, short-range mobile wireless devices, such as, Wi-Fi, BLE, cellular, do not satisfy these needed conditions because the mobile wireless device is too close to the corresponding base station. Specifically, the described embodiments are operable if the beam steering (direction of the beam) accuracy requirements are low enough to handle the noise/uncertainty of a 6-axis IMU rotation integration process, which rules out, for example, Ka band (26.5-40 GHz) transmitters/receivers.

FIG. 1 shows a wireless device 110 operating to communicate with a base station 140 through a satellite 192, according to an embodiment. For at least some embodiments, the wireless device 110 is a mobile device. For an embodiment, the wireless device 110 is able to communicate with an outside network 180 through the base station 140.

Further, for at least some embodiments, an antenna array 120 of the wireless device forms a directional beam that facilitates a wireless communication link 117 through the satellite 192 to the base station 140. Due to motion of the wireless device 110, the direction of the directional beam needs to be updated over time. The wireless communication between the wireless device 110 and the base station 140 is also enabled by a radio 130 of the wireless device 110 and a radio 145 of the base station 140.

For at least some embodiments, the wireless device 110 includes motion sensors 124. Further, the wireless device 110 includes a controller 122 that receives the sensed motion from the motion sensors 124, and adapts a direction of the directional beam formed by the antenna array 120 accordingly.

For at least some embodiments, the controller 122 operates to determine a direction of the wireless link to the satellite 192 from the wireless device 110 based on one or more measured signal metrics (for example, RSSI) of wireless communication (through the wireless communication link 117) with the base station 140. The controller 122 further operates to select at least one of a plurality of beamforming direction settings of the multiple antenna array 120 of the radio 130 of the wireless device 110.

The motion sensors 124 sense motion of the wireless device 110. The controller 122 uses the sensed motion to measure motion of the wireless device relative to the determined wireless link direction.

Further, the controller 122 operates to select a one of the plurality of beamforming settings for communicating with the base station based on the determined wireless link direction, a one of the plurality of beamforming settings that corresponds with the determined wireless link direction, and the sensed motion relative to the reference orientation.

For at least some embodiments, the controller 122 further operates to receive data from connected data sources 111, 112, 113. The controller collects the received data, and communicates the collected data to the base station 140 through the wireless link 117. For an embodiment, the base station 140 provides the collected data to an outside network 180. For an embodiment, the base station accesses a network management element 150 that includes a database 160 of information that can be used for aiding the communication of the collected data from the data sources 111, 112, 113, through the wireless device 100, to the base station 140.

Figure 2:
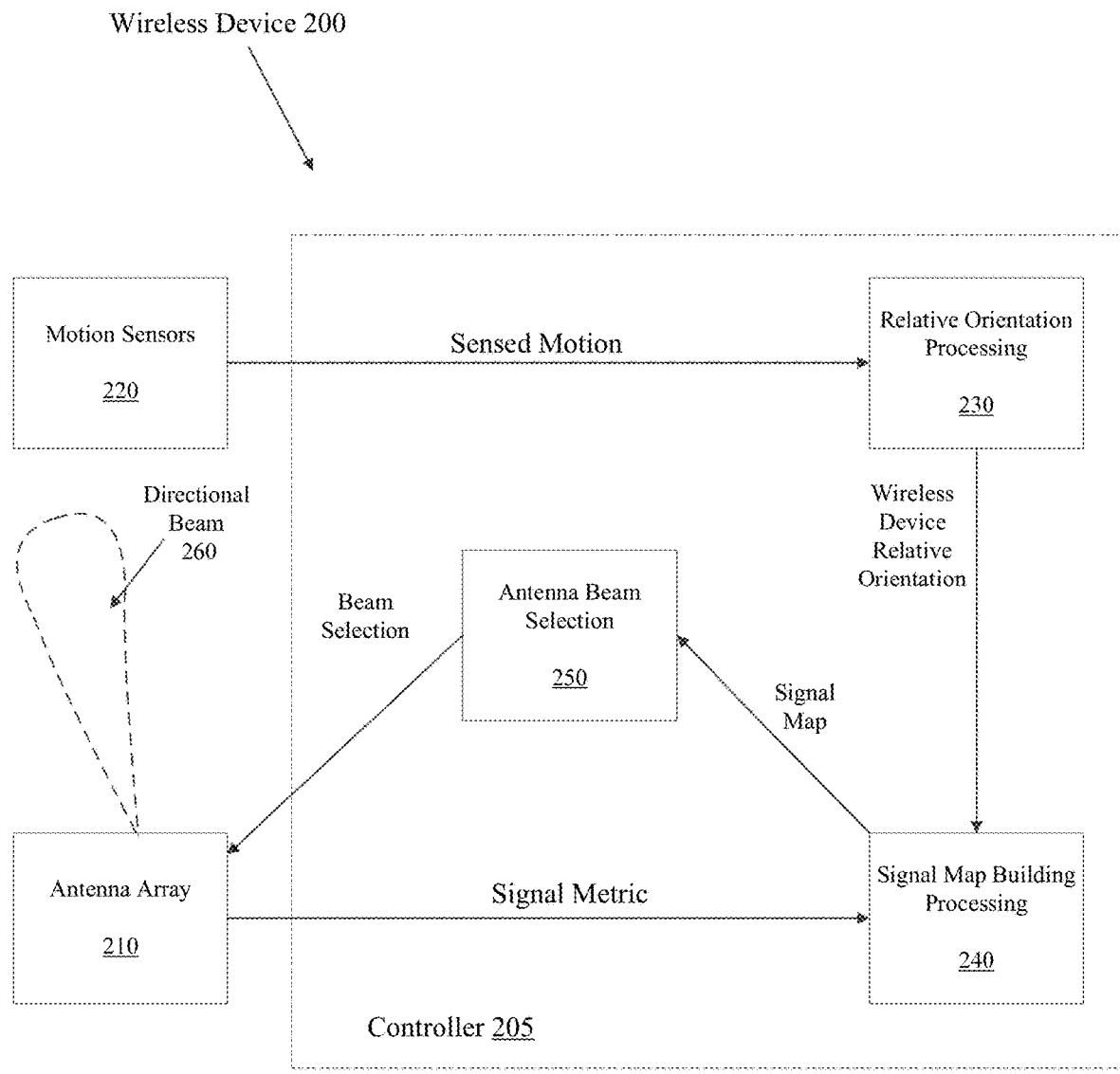
FIG. 2 shows a block diagram of a wireless device that includes control of antenna steering of the wireless device, according to an embodiment.

FIG. 2 shows a block diagram of a wireless device 200 that includes control of antenna steering of the wireless device 200, according to an embodiment. As shown, an antenna array 210 forms a directional beam 260. For an embodiment, the direction of the directional beam 260 is adjustable to multiple directions.

As shown, a communication signal metric (for example, received signal strength) is measured. For an embodiment, signal map building processing of a controller 205 of the wireless device 200 receives the signal metric. For an embodiment, a value of the signal metric is dependent on how well the directional beam 260 is aligned with the direction of the wireless link between the wireless device 200 and the base station. It is to be understood that the wireless link may be a LOS (line-of-sight) wireless link or a NLOS (non-line-of-sight) wireless link. Either way, the wireless link is in a direction that provides a quality (better than a threshold) wireless link between the wireless device 200 and the base station.

How well the directional beam 260 is aligned with the direction of the wireless link between the wireless device 200 and the base station is influenced by both the selected direction of the directional beam 260, and the orientation of the wireless device 200. That is, as the wireless device 200 changes its physical orientation, the alignment of the directional beam 260 with the direction of the wireless link between the wireless device 200 and the base station changes. Accordingly, the described embodiments provide for reselection of the direction of the directional beam 260 to maintain the alignment (or at least improve the alignment)

of the directional beam 260 with the direction of the wireless link between the wireless device 200 and the base station.

For an embodiment, signal map building processing 240 includes tracking the signal metric (for example, RSSI) of a received signal while the orientation of the wireless device changes, and for different selections of the direction of the directional beam 260. Visually, this can be realized by a virtual sphere, wherein the mapping includes plotting the RSSI along the surface of the sphere as the physical orientation of the wireless device changes, and the selected direction of the directional beam changes. The value of the RSSI reflects the quality of the connection through the wireless link to the base station.

As shown, one or more motion sensors 220 sense changes in orientation of the wireless device 200. As previously described, for an embodiment, the motion sensors 220 include a 6-axis IMU. For an embodiment, the 6-axis IMU includes a 3-axis accelerometer and a 3-axis gyroscope. For an embodiment, the sensed motion is provided to relative orientation processing 230 of the controller 205 of the wireless device 200.

The relative orientation processing 230 provides an input to the signal map building processing 240 that reflects the orientation of the wireless device. For an embodiment, the relative orientation processing 230 provides an input to the signal map building processing 240 that reflects the orientation of the wireless device relative to the determined direction of the wireless link to the satellite.

A signal map is provided to an antenna beam selector 250 which selects the beamforming direction selection of the antenna array 210.

Figure 3:
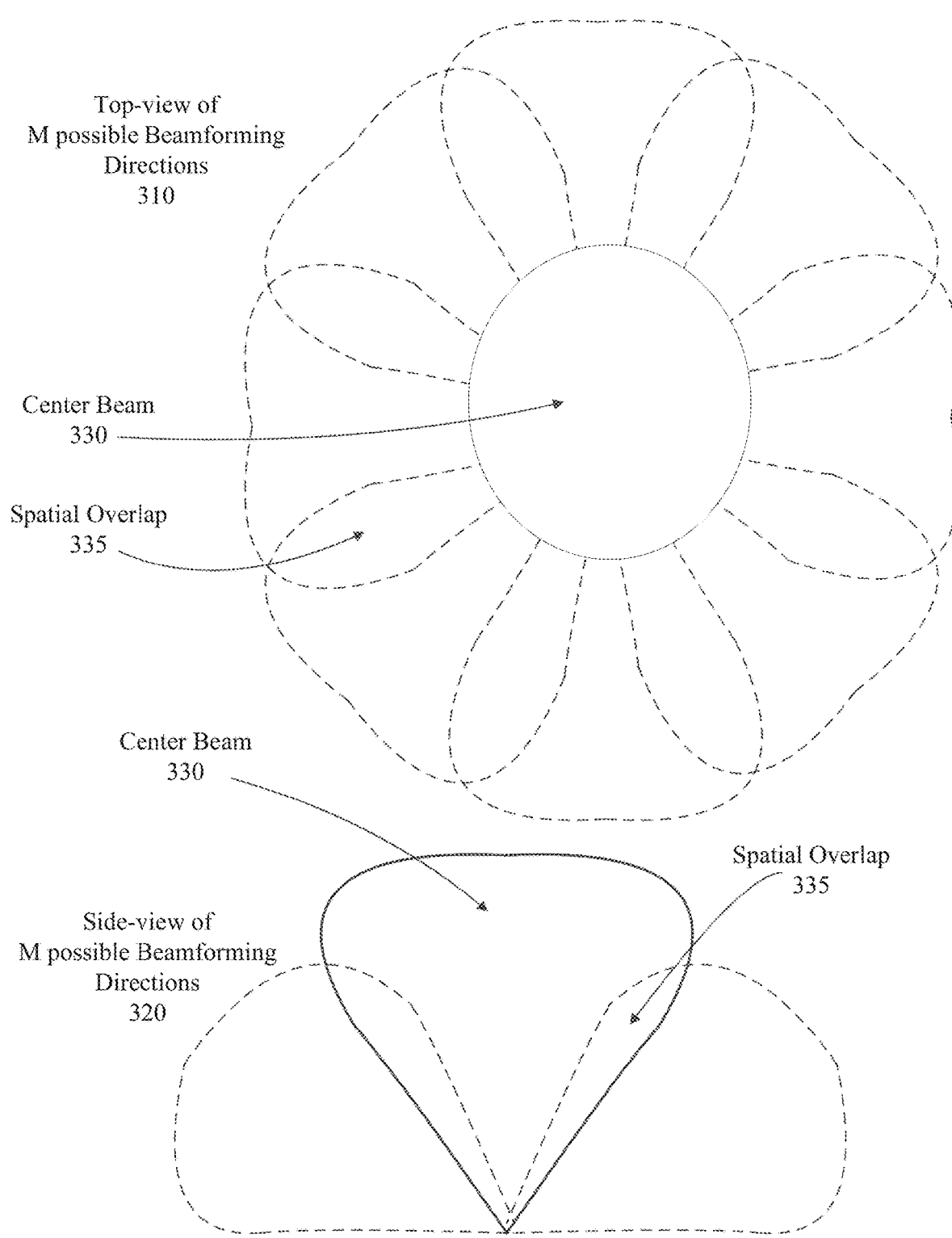
FIG. 3 shows M possible beamforming directions of the multiple antennas of a wireless device, according to an embodiment.

FIG. 3 shows M possible beamforming directions of the multiple antennas of a wireless device, according to an embodiment. FIG. 3 shows a top-view 310 of the possible beamforming directions, and a side-view 320 of the possible beamforming directions. For an embodiment, a single beamforming direction is selected at a time. As described, the relative angular relationships between the different beamforming settings can be predetermined and stored for reference. As described, a direction of the wireless link to the satellite is estimated or determined based on monitoring and measuring received signal quality metrics over time.

The exemplary top-view 310 shows 9 possible beamforming directions with a center beam 330. For an embodiment, the center beam 330 projects outwards from the wireless device at approximately 90 degrees from the top face of the device, and the side beams project at varying side angles. Further, as shown, for at least some embodiments, a spatial overlap 335 exists between the different beamforming directions.

For at least some embodiments, an array of antennas forms the different beams. The different beamforming directions can be selected by adjusting a phase and/or an amplitude of signals coupled through the antenna elements of the array of antennas. For an embodiment, a finite number of phase delay (shifts) allow for the selection of one of a finite number of possible beam directions. For an embodiment, the different beam directions are predetermined and stored in memory that is accessible by a controller of the wireless device. Further, the relative spatial orientations between the selectable beams are known. For an embodiment, the known relative spatial orientations between the different beams are utilized by the controller in the selection of beamforming pattern directions over time.

While the beams of FIG. 3 are shown as being uniform and essentially the same in shape, it is to be understood that the shapes of the different beams can vary. For an embodiment, the shapes and characteristics of the different beams can additionally be used in the selection of a beamforming direction. Further, wireless signals communicated through the different beams can have different signal characteristics that can additionally be used for selecting the beamforming direction. For example, one beam direction may be more susceptible to interference. Accordingly, this signal characteristic may be used to influence a non-selection of that beam direction. Other signal characteristics may additionally or alternatively be used in the beam direction selection.

FIG. 4 is a flow chart that includes steps of a method of control of antenna steering of a wireless device, according to an embodiment. A first step 410 includes selecting at least one of a plurality of beamforming direction settings of a multiple antenna array of a radio of a wireless device. A second step 420 includes retrieving spatial relationships between each of different beamforming directions of the plurality of beamforming direction settings. A third step 430 includes receiving, by the radio of the wireless device, a wireless signal from a base station and measuring one or more signal metrics of the wireless signal. A fourth step 440 includes sensing motion of the wireless device. A fifth step 450 includes identifying a wireless connection direction for establishing a wireless connection with the base station based on the one or more signal metrics, the at least one of the plurality of beamforming direction settings used while receiving the wireless signal, and an orientation of the wireless device determined based on the sensed motion of the wireless device. A sixth step 460 includes selecting a one of the plurality of beamforming direction settings for communicating with the base station based on the wireless connection direction, a one of the plurality of beamforming settings that corresponds with the wireless connection direction, and the sensed motion of the wireless device.

Identifying a Wireless Connection

For at least some embodiments, receiving, by the radio of the wireless device, the wireless signal from the base station and measuring the one or more signal metrics of the wireless signal includes scanning, by the radio of the wireless device, through the plurality of beamforming direction settings of the multiple antenna array of the radio. Further, the wireless connection (to, for example, the base station through a satellite link) can be identified by receiving and measuring the one or more signal metrics of the wireless signal at each of the scanned plurality of beamforming direction settings. That is, the wireless connection can be identified by the beamforming direction that provides the strongest received wireless signal. If, for example, the wireless device is not in motion, the wireless connection direction can be identified by scanning through the available beamforming directions of the wireless device, and selecting, for example, the beam direction having the greatest received signal strength. Since the relative orientations of the different beam directions are known, monitored angular motion of the wireless device can be used for selection of new beamforming directions.

For at least some embodiments, identifying the wireless connection direction includes selecting, by the radio of the wireless device, a one of the plurality of beamforming direction settings of a multiple antenna array of the radio, and receiving, by the radio of the wireless device, the wireless signal from the base station and measuring the one or more signal metrics of the wireless signal while the wireless device is subjected to motion over time. That is, for example, by selecting a single beamforming direction, and monitoring the motion of the wireless device, the wireless connection direction can be identified, for example, by the direction having the greatest received signal strength. Once identified, future beamforming direction selections can be made based on future monitoring of the motion of the wireless device and the known relative orientation between the different available beamforming directions of the wireless device.

The described embodiments include sensing motion of the wireless device. For at least some embodiments, the sensed motion includes sensed rotational motion. However, other embodiments could include, for example, sensing translational motion.

Signal Map or Probability Map

At least some embodiments further include generating a signal metric map or a probability map, wherein the signal metric map or the probability map is generated based on sensed motion of the wireless device and the one or more measured signal metrics. The maps can be visualized as a spherical surface in which the wireless device is at the center of the spherical surface. As different beamforming directions are scanned, and/or as rotational motion of the wireless device is monitored over time, monitored and measured signal parameters of reception of a wireless signal received from a base station through a satellite can be represented on the spherical surface.

For at least some embodiments, the signal metric map includes relationships between directions of the wireless device and the measured signal metrics. The relationships can be monitored over time.

For at least some embodiments, the probability map includes estimated probabilities of the wireless connection direction for establishing a wireless connection to the base station in given directions. That is, for each of possible directions, the probability map provides a probability for each of the possible directions that that direction is the direction of the wireless link to the base station through the satellite.

As previously described, one or more signal metrics are measured. At least some embodiments further include associating a time with the one or more measured signal metrics. At least some embodiments further include tracking a duration of time over which the one or more measured signal metrics are sensed.

At least some embodiments further include generating the estimated probabilities of the probability map based on the time associated with the one or more measured signal metrics, and/or the tracked duration of time associated with the one or more measured signal metrics. For an embodiment, a more recent measurement is given more weight than a less recent measurement. Further, for an embodiment, a measurement taken over a longer duration of time is given more weight than one taken over a lesser duration of time. That is, a signal that is observed for a longer duration of time can be considered more trustworthy.

For at least some embodiments, the signal map or the probability map is generated further based on the spatial relationships between each of different beamforming directions of the plurality of beamforming direction settings and the one or more measured signal metrics for the plurality of beamforming direction settings. That is, the different beam directions can represent different portions of the map. Selecting different beamforming directions and monitoring the measured signal metric allows for filling out the map.

For at least some embodiments, the selecting of one of the plurality of beamforming direction settings for communicating with the base station based on the wireless connection direction, the one of the plurality of beamforming settings that corresponds with the wireless connection direction, and the sensed motion of the wireless device further includes referencing the signal map or the probability map. The signal map or the probability map can be continuously updated and can aid in improving the selection of the beamforming directions.

Beamforming Direction Selection

For at least some embodiments, a frequency for reselecting a one of the plurality of beamforming settings for communicating with the base station is based on a function of angular velocity of the wireless device. That is, the faster or more rapidly the wireless device is rotating or moving, the higher the sampling or the beam selection rate. Motion of the wireless device can obsolete a beamforming direction selection. Accordingly, the greater the motion of the wireless device, the more frequently new beamforming selections should be made.

For at least some embodiments, a timing for reselecting a one of the plurality of beamforming settings for communicating with the base station is synchronized with a sleep cycle of receive and transmit chains of the wireless device. For at least some embodiments, there are specific periods of time (based on modem constraints) where valid signals can be received. At least some embodiments include monitoring and measuring the received signal metrics, wherein the monitoring and measuring is synchronized with the specific periods which allows the signal readings (measurements) to be more reliable and timely. The selected timing of the monitoring and measuring of the received signal metric provide for increasing efficiency.

For at least some embodiments, the received wireless signal is adjusted or filtered. For an embodiment, the adjusting or filtering includes adjusting or filtering measured signal metrics which are statistically improbable. For a specific embodiment, this includes generating or creating a model that filters or adjusts measured signal metrics which are statistically improbable to a more probable value.

For at least some embodiments, the sensed motion is adjusted or corrected based on received wireless signal. For an embodiment, the received wireless signal or metrics of the received wireless signal are used to adjust or calibrate the sensed motion signals. As previously described, for an embodiment, the motion sensors include an IMU (inertial measurement unit). At times, the IMU which tracks the antenna's motion can drift over time. At least some embodiments include correcting the drift by calibrating the IMU against the signal metrics.

For at least some embodiments, the identified wireless connection direction for establishing the wireless connection with the base station is through a first satellite, and further includes identifying a second wireless connection for establishing a second wireless connection with a second satellite. For example, a first satellite may be utilized for communicating data with a base station, and a second satellite may be utilized for receiving navigational, such as, GPS, information. Accordingly, the wireless device may need to support wireless links to both of the satellites and different wireless link directions associated with each of the wireless links. An embodiment includes performing the link direction identification and motion sensing for selecting the beamforming direction setting for one satellite, and then for the other satellite. This can include temporally switching between selecting the wireless link direction for the first (such as, a communication network) satellite and selecting the wireless link direction for the second (such as, a GPS) satellite.

At least some embodiments include coordinating switching between selecting the one of the plurality of beamforming direction settings for communicating with the base station based on the wireless connection direction, and selecting the one of the plurality of beamforming direction settings for receiving wireless signals from the second satellite based on the second wireless connection direction, wherein the coordinated switching is based on a sleep cycle of the wireless device. More specifically, for an embodiment, a timing of the coordinated switching (new selections of beamforming directions) is based on sleep cycles of the modem of the radio of the wireless device.

As previously described, for an embodiment, the motion sensors of the wireless device include a 6-axis IMU. For an embodiment, the 6-axis includes 3-axis of acceleration, and 3-axis of a gyroscope. However, for at least some embodiments the wireless device further includes a magnetometer, and the wireless link direction is selected additionally based on magnetic field sensing of the magnetometer.

At least some embodiments include altering a sleep cycle of the wireless device for the selecting the one of the plurality of beamforming direction settings for communicating with the base station, thereby ensuring a stable wireless connection with the base station when the wireless device wakes up from the sleep cycle. That is, at least some embodiments include modifying/interrupting the wireless device's sleep cycle to support beamforming direction steering and scanning requirements needed for the antenna beamforming direction selections of the wireless device. For supporting a wireless connection (for example, an NB-IOT (narrow band, internet of things) wireless connection) the modem of the radio of the wireless device should have a stable connection during on-duration period (period of scheduled wireless communication) and should be ready to receive downlink packets from the base station through the satellite. As described, at least some embodiments include waking up the wireless device, including performing the antenna beamforming direction selection prior to the scheduled wireless communication to ensure a stable wireless connection during the wireless communication.

For at least some embodiments, ensuring the stable wireless connection includes altering a sleep cycle of the wireless device for the selecting the one of the plurality of beamforming direction settings for communicating with the base station, thereby ensuring a stable wireless connection with the base station when the wireless device is servicing a data transmission request. For a specific embodiment, this includes synchronizing a timing for reselecting a one of the plurality of beamforming settings for communicating with the base station with a data transmission request of the wireless device. It is preferred to avoid changing the antenna array beamforming direction selection settings while data transmission or reception is in progress. As per the NB-IOT protocol, the modem of the wireless device receives a data transmission request during sleep cycle. Upon receiving the data transmission request, the modem of the radio of the wireless device wakes up to transmit or receive the data. At least some embodiments include the wireless device performing the antenna array beamforming direction selection, and then initiating the data transmission. This sequence of control of the wireless device ensures a robust wireless connection during data transmission.

As previously described, for at least some embodiments, previously existing knowledge of the characteristics of each beam, and signal characteristics of wireless signal communicated through one or more of the plurality of beamforming directions may be additionally used in the beamforming direction selection. That is, certain beams may be more or less susceptible to interference, or may provide better received signal strength due to, for example, antenna gain. The susceptibility to interference may be additionally used in the beamforming direction selection. The antenna gain or other characteristics of the different beams may additionally be used in the beamforming direction selection.

Figure 5:
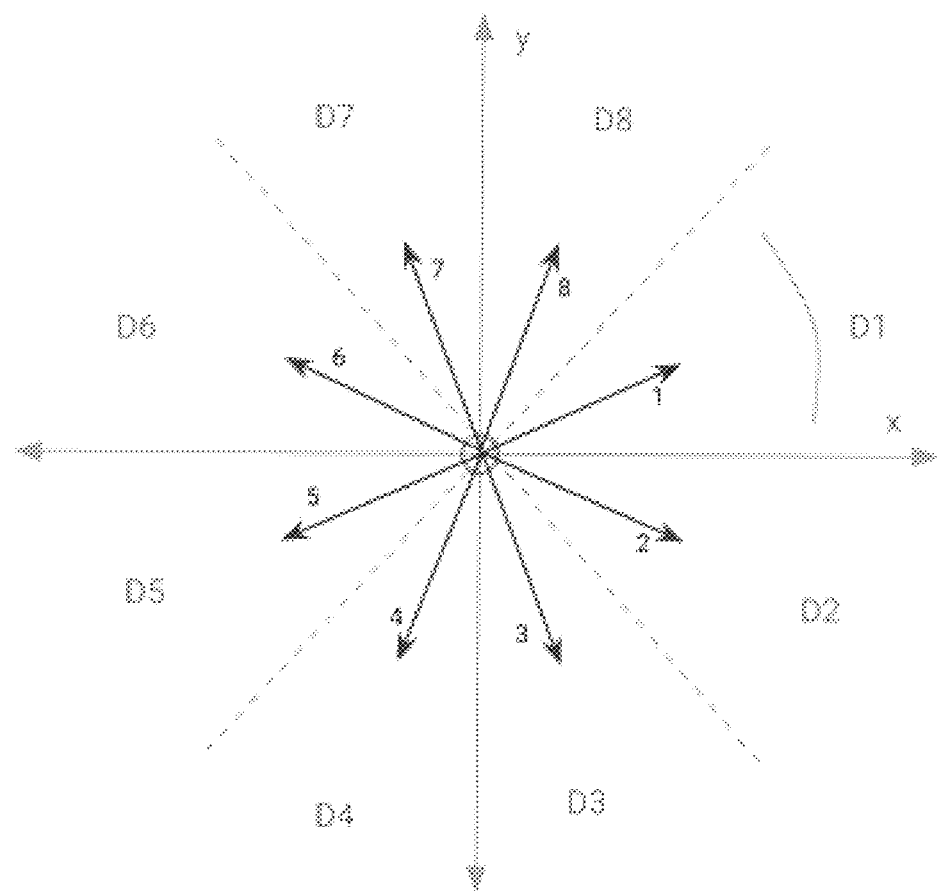
FIG. 5 shows an example of antenna beamforming directions of an antenna array relative to each other, according to an embodiment.

FIG. 5 shows an example of antenna beamforming directions of an antenna array relative to each other, according to an embodiment. For at least some embodiments, the selection of the direction of the beam formed by the antenna array of the wireless device is made to steer the beam to the direction that yields the best quality communication link between the wireless device and the base station. For an embodiment, the selection of the direction of the beam is made based on measured signal strength of wireless signals received from the base station, and based on motion sensing by the motion sensors. The goal of the beam direction selection process is to identify which direction provides the best quality wireless link, and then to keep track of that direction so that the antenna can be steered towards that direction. It is important to note that the directions that are identified and tracked are only relative to the positions of the antenna's beams, and don't correspond to set directions such as North or South.

For an embodiment, as previously described, in order to determine the beamforming direction with the strongest signal a "scan" is performed. During the scan, for an embodiment, as many directions are tested as there are possible beam directions. When testing a direction, the antenna is steered towards this direction and the signal strength is recorded.

Spatially, "directions" are oriented in three dimensional space and can be represented as unit vectors extending from an origin. The original orientation in which the direction vectors are positioned does not matter, but the direction vectors must be positioned in a relative orientation (relative to each other) that is identical to the relative orientation between the antenna's beam vectors. A beam vector is a theoretical unit vector that cuts through the center of a beam's lobe's center of mass.

For an embodiment, when scanning begins, both the direction vectors and beam vectors are initialized. At the beginning, the two sets of vectors are exactly the same. If the orientation of the antenna is changed, then the orientation of the beam vector array is similarly rotated, but the orientation of the direction vectors always remains the same. When any direction vector is selected to be tested during scanning, the antenna is steered towards the beam corresponding to the beam vector which is closest to the direction vector corresponding to the direction chosen.

Once every direction has been scanned, the direction with the strongest signal can be chosen as the direction to track. A unit vector is created to point towards this "best direction", and is termed the "satellite vector", and also referred to as "the direction of the wireless link to and from the satellite", for convenience, as it is a reasonable assumption that the direction with the strongest signal is the one that is pointing closest to the direction of the satellite. This satellite vector can either be identical to the direction vector corresponding to the direction with the strongest signal, or it can be an aggregate of the direction vectors, each vector somehow scaled by the signal recorded in that direction.

The determination of the satellite vector signals the end of the scanning phase process, and the beginning of the tracking phase. The tracking phase continually chooses the beam corresponding to the beam vector which has the smallest angle with the satellite vector. As it was with the scanning phase, the beam vectors are continuously updated to match the changing orientation of the antenna. If a good signal is observed, then the satellite vector is updated by pointing it towards the beam vector. This step is repeated until the observed signal falls below an acceptable threshold for a given time, at which point the tracking phase is halted, and the scanning phase is started again.

FIG. 5 shows an example of 9 different beamforming directions (D0-D8, where D0 is directed perpendicular to the beamforming directions illustration) associated with 9 different beamforming direction settings of the wireless device. Note that the $9^{th}$ direction is perpendicular and visually points out from the illustration. Based on scanning through the different antenna beamforming directions and the corresponding received wireless signal parameters, the best antenna beamforming pattern can be selected.

Figure 6:
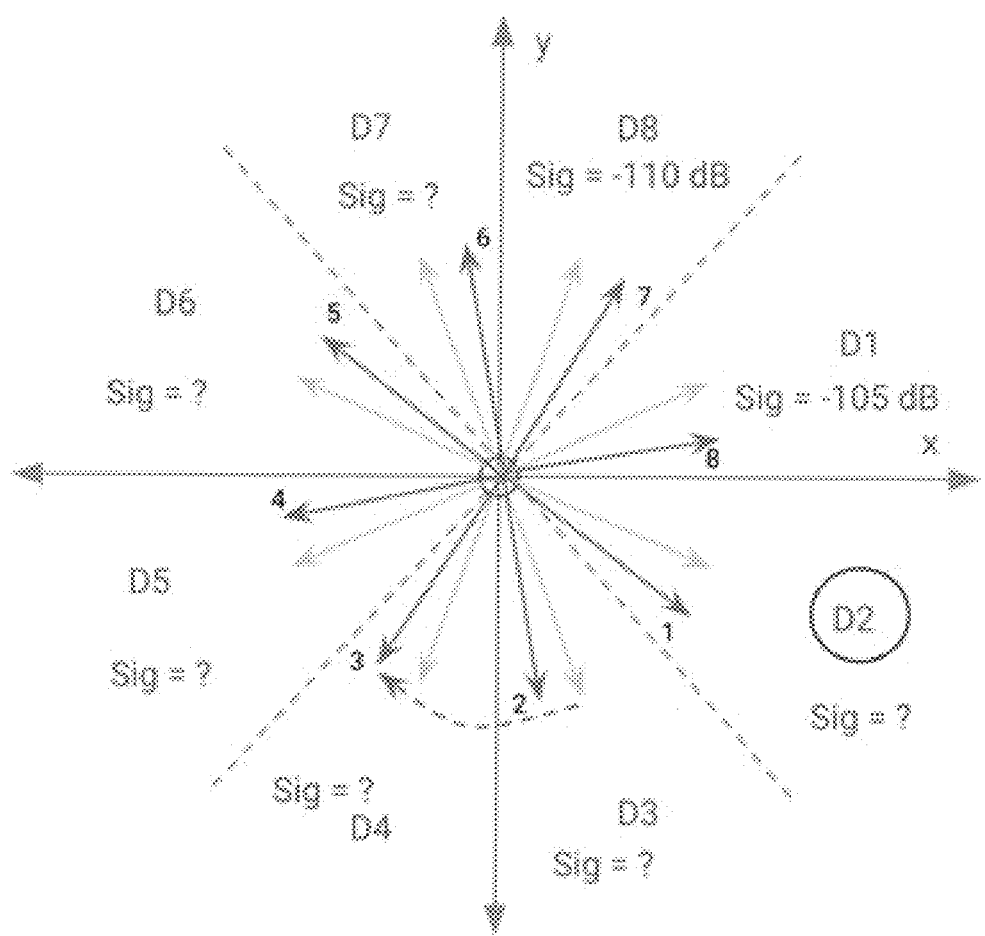
FIG. 6 shows the antenna beamforming directions of an antenna array of a wireless device relative to each other, wherein the wireless device has been subjected to rotational motion, according to an embodiment.

FIG. 6 shows the antenna beamforming directions of an antenna array of a wireless device relative to each other, wherein the wireless device has been subjected to rotational motion, according to an embodiment. As shown, the exemplary beamforming array directions of FIG. 5 are rotated as the wireless device is subjected to motion. Accordingly, an antenna array beamforming direction scan will yield different values of received wireless signal metrics. Between scans, the sensed motion of the motion sensors along with the previously determined wireless link direction can be used for reselecting the antenna beamforming direction.

Figure 7:
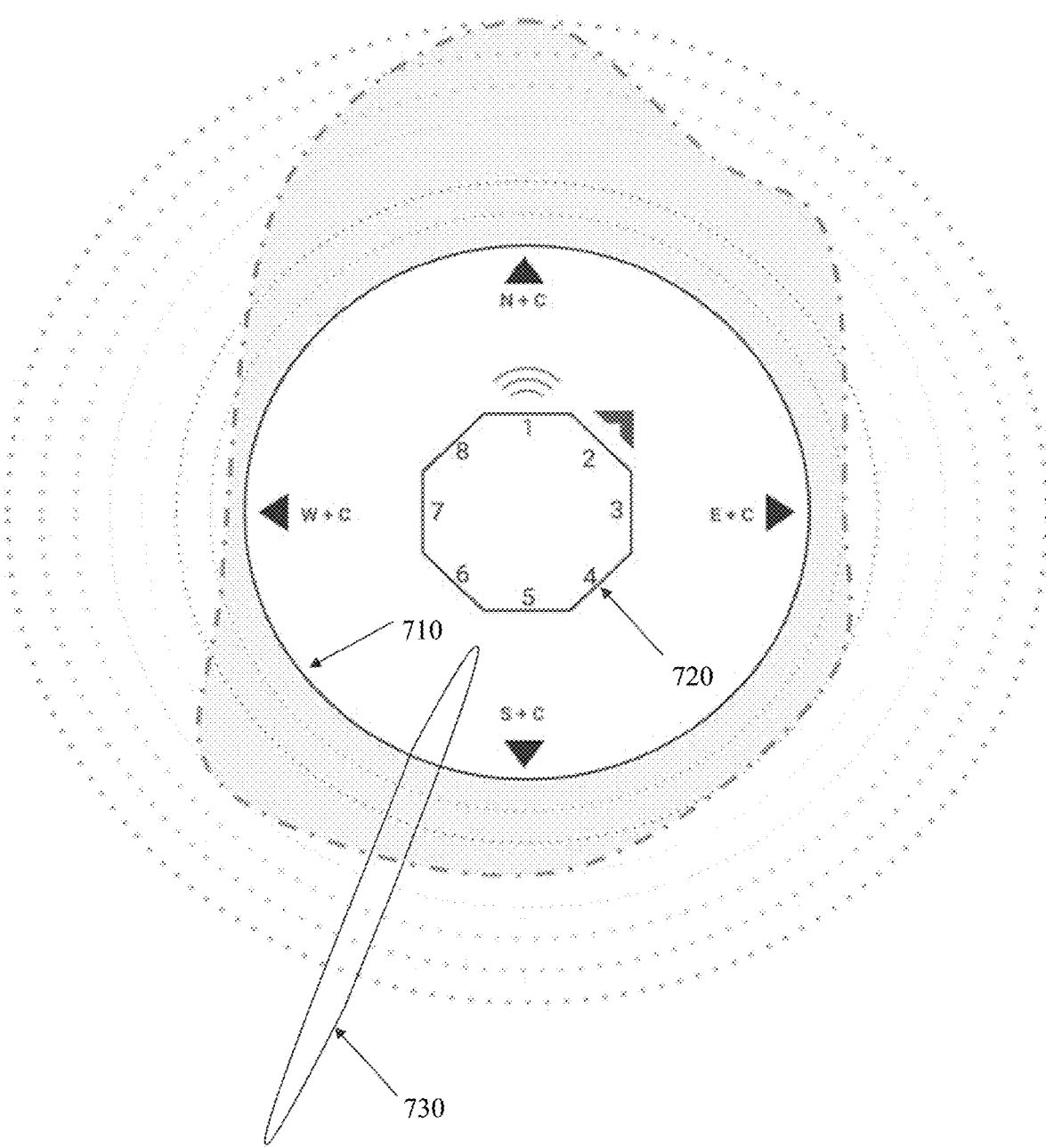
FIG. 7 shows a representation of a spherical map in which measured values of a received signal value metric have been plotted on the spherical map, according to an embodiment.

FIG. 7 shows a representation of a spherical map in which measured values of a received signal value metric have been plotted on the spherical map, according to an embodiment. The inner circle 710 represents reference directions to which the antenna's change in orientation is relative. Notice that each direction represented by a point in this reference circle 710 can be thought of as a cardinal direction+some unknown constant number of degrees, C. The inner octagon 720 represents the antenna, which is assigned an orientation that can be associated with a direction on the circle, (that is, N, S, W, E, NNE, etc). In this example, the "front" of the antenna is facing NE in the relative direction representation. Each side of the octagon 720 represents a beam of the antenna. When a beam is active, the antenna senses signal in the direction the beam, (or octagonal side), is facing. The beams of the antenna are numbered so that they can be easily referenced. In FIG. 7, beam 1 is active, so a signal can be observed in the direction towards relative North. Metrics obtained about the observed signal, such as signal strength and quality, can be used by the Signal Map Building Algorithm to update the understanding of the signal quality found in any direction. The outcome of this algorithm is a mapping from direction to signal quality, which can be updated over time as new information is collected. This direction-signal mapping is represented in FIG. 7 by the shaded area bordered by the dotted line. The concentric dotted circles 730 surrounding the inner circle 710 represent the quality of signal, where signal quality increases with radius. For this example, the best signal is thought to be in the relative North direction, where the shaded area extends to the outer concentric circle (of the concentric dotted circles 730).

Figure 8:
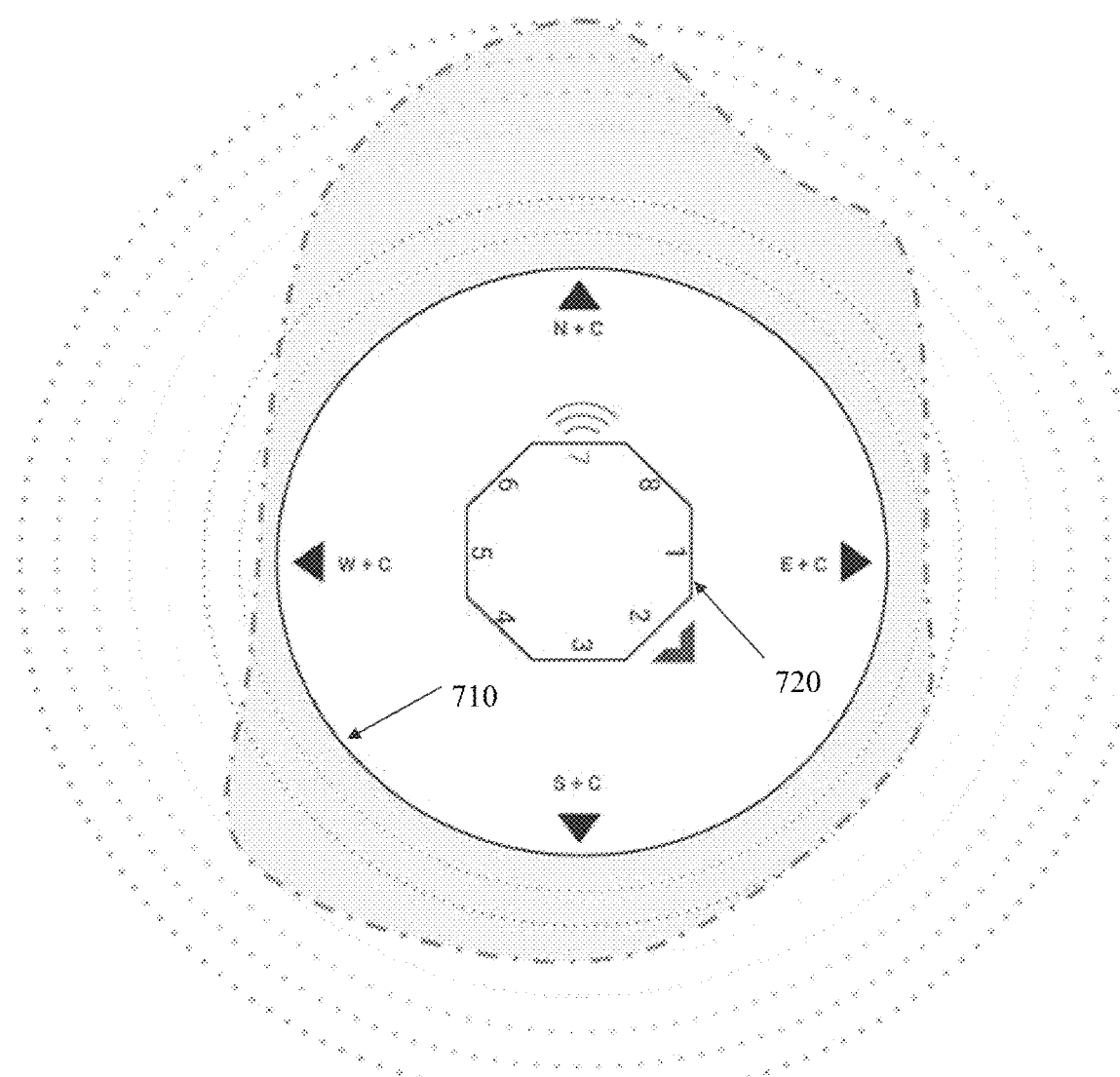
FIG. 8 shows a representation of a spherical map in which measured values of a received signal value metric have been plotted on the spherical map, according to an embodiment.

FIG. 8 shows a representation of a spherical map in which measured values of a received signal value metric have been plotted on the spherical map, according to an embodiment. The spherical map of FIG. 8 represents a possible continuation of the spherical map shown in FIG. 7. The antenna has turned 90 degrees clockwise such that the "front" of the antenna has turned from the NE direction to the SE direction. If it is desirable in this situation for the antenna to remain focused on the N direction, as this is the direction from which the best signal has been observed, then the antenna is steered to beam 7, as beam 7 is closest to the N direction.

Figure 9A:
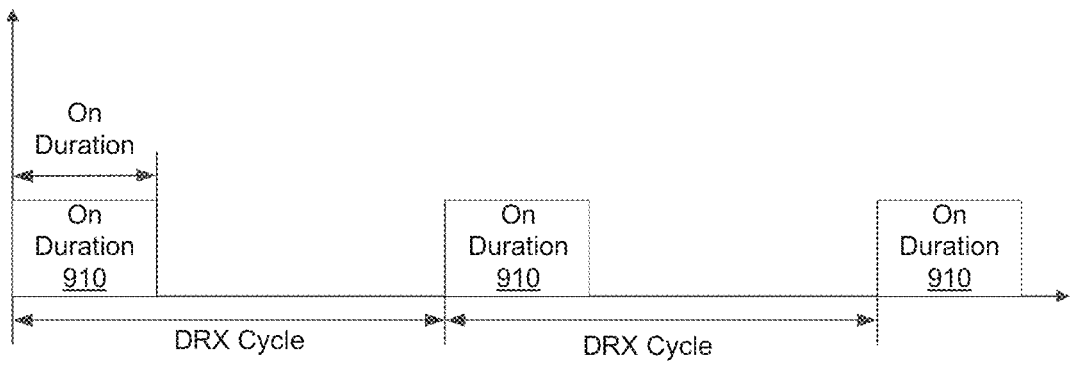
FIGS. 9A, 9B, 9C show timing diagrams of a sleep cycle of one type of wireless communication, and possible timing of antenna beamforming direction selections relative to the sleep cycles, according to an embodiment.
Figure 9B:
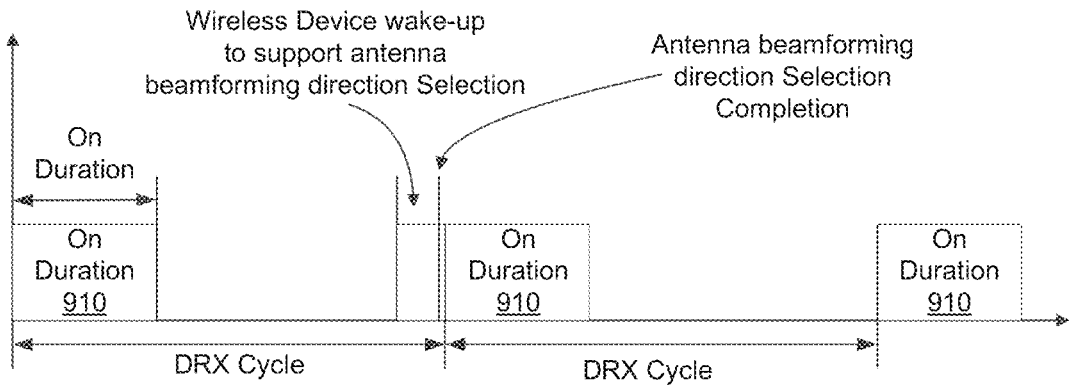
Figure 9C:
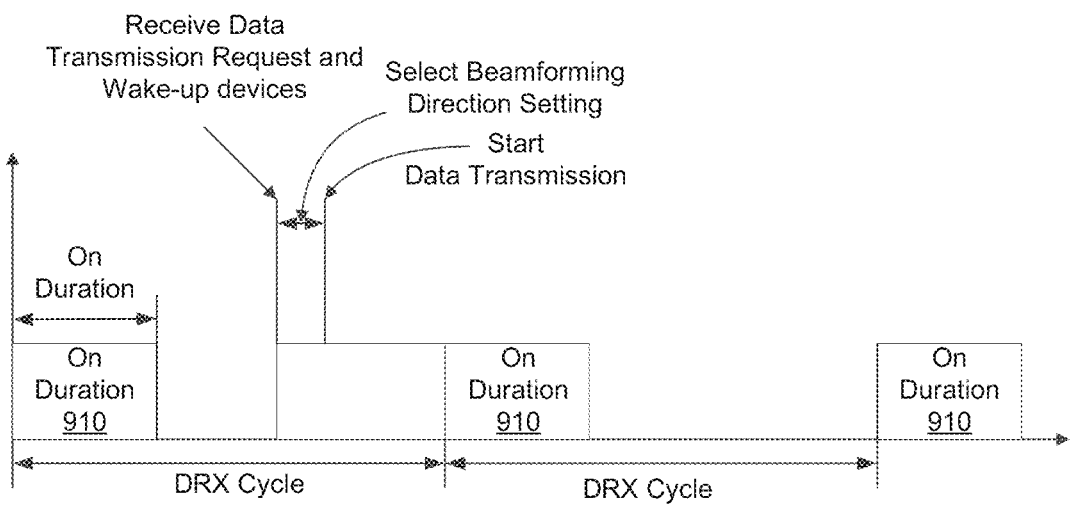

FIGS. 9A, 9B, 9C show timing diagrams of a sleep cycle of one type of wireless communication, and possible timing of antenna beamforming direction selections relative to the sleep cycles, according to an embodiment. FIG. 9A shows a timing diagram of an NB-IOT sleep cycle. As shown, a DRX cycle includes an "On Duration" 910 and a sleep cycle or duration (duration of DRX cycle which is not the On Duration 910). During the On Duration the wireless device operating as a NB-IOT device wirelessly communicates through the satellite to an upstream base station. For at least some embodiments, DRX/eDRX parameters control or dictate the On Duration" and the sleep cycle. For an exemplary embodiment, the On Duration can be 128 milliseconds, and the DRX cycle can be 10 seconds.

FIG. 9B shows a timing diagram in which the sleep cycle of the wireless device is "woken up" prior to the on time. The wireless device (or at least the modem of the radio of the wireless device) is activated prior to the On Duration 910 in order for the wireless device to perform antenna beamforming direction selection for facilitating the wireless communication to be selected and operating before the timing of the wireless communication. That is, the beamforming direction selection is performed during the sleep cycle before the On Duration 910 to ensure a level of communication quality during the actual time of data transmission during the On Duration 910.

FIG. 9C shows another timing diagram in which the sleep cycle of the wireless device is "woken up" prior to the on time. For at least some embodiments, rather than immediately sending data of "waking up", the wireless device first checks a signal strength of signals received through a currently selected beam. If the signal strength is below a threshold, and therefore, not good for maintaining wireless connectivity, then the wireless device can perform antenna beamforming direction selection to facilitate the wireless communication. This enables uninterrupted data connectivity between the wireless device and base station as the wireless device utilizes the time when it was supposed to be unavailable. As per the 3GGP standard, two modes of operation of a wireless device include an active mode and a sleep mode, wherein the wireless device periodically switches between the active mode and the sleep mode. While in the active mode, the receiver chain of the wireless device is active (turned on) and the wireless device can receive messages from the base station. For at least some embodiments, by performing the antenna selection while the wireless device was supposed to be in sleep mode, robust connectivity can be maintained when the wireless device is in active mode.

Although specific embodiments have been described and illustrated, the embodiments are not to be limited to the specific forms or arrangements of parts so described and illustrated. The described embodiments are to only be limited by the claims.

What is claimed:
1. A method, comprising:
 selecting at least one of a plurality of beamforming direction settings of a multiple antenna array of a radio of a wireless device;

retrieving spatial relationships between each of different beamforming directions of the plurality of beamforming direction settings;

receiving, by the radio of the wireless device, a wireless signal from a base station and measuring one or more signal metrics of the wireless signal;

sensing motion of the wireless device;

identifying a wireless connection direction for establishing a wireless connection with the base station based on the one or more signal metrics, the at least one of the plurality of beamforming direction settings used while receiving the wireless signal, and an orientation of the wireless device determined based on the sensed motion of the wireless device;

wherein the identified wireless connection direction for establishing the wireless connection with the base station is through a first satellite, and further comprising identifying a second wireless connection for establishing a second wireless connection with a second satellite; and selecting a one of the plurality of beamforming direction settings for communicating with the base station based on the wireless connection direction, a one of the plurality of beamforming settings that corresponds with the wireless connection direction, and the sensed motion of the wireless device.

2. A method, comprising:

selecting at least one of a plurality of beamforming direction settings of a multiple antenna array of a radio of a wireless device;

retrieving spatial relationships between each of different beamforming directions of the plurality of beamforming direction settings;

receiving, by the radio of the wireless device, a wireless signal from a base station and measuring one or more signal metrics of the wireless signal;

sensing motion of the wireless device;

identifying a wireless connection direction for establishing a wireless connection with the base station based on the one or more signal metrics, the at least one of the plurality of beamforming direction settings used while receiving the wireless signal, and an orientation of the wireless device determined based on the sensed motion of the wireless device; and selecting a one of the plurality of beamforming direction settings for communicating with the base station based on the wireless connection direction, a one of the plurality of beamforming settings that corresponds with the wireless connection direction, and the sensed motion of the wireless device;

wherein a timing for reselecting a one of the plurality of beamforming settings for communicating with the base station is synchronized with a sleep cycle of receive and transmit chains of the wireless device.

3. A wireless device, comprising:

a radio operative to establish a wireless connection to a base station through a satellite;

a multiple antenna array of the radio operative to form beams for facilitating the wireless connection;

a controller, the controller operative to:
select at least one of a plurality of beamforming direction settings of the multiple antenna array of the radio of the wireless device;
retrieve spatial relationships between each of different beamforming directions of the plurality of beamforming direction settings;
wherein the radio further operates to receive a wireless signal from the base station and measure one or more signal metrics of the wireless signal;

one or more motion sensors operative to sense motion of the wireless device;

wherein the controller is further operative to:
identify a wireless connection direction for establishing the wireless connection with the base station based on the one or more signal metrics, the at least one of a plurality of beamforming direction settings used while receiving the wireless signal, and an orientation of the wireless device determine based on the sensed motion of the wireless device; and
select a one of the plurality of beamforming direction settings for communicating with the base station based on the wireless connection direction, a one of the plurality of beamforming settings that corresponds with the wireless connection direction, and the sensed motion of the wireless device.

4. The wireless device of claim 3, wherein the radio is further configured to receive the wireless signal from the base station and measure one or more signal metrics of the wireless signal comprises the radio operating to:
scan through the plurality of beamforming direction settings of the multiple antenna array of the radio;
receive and measure the one or more signal metrics of the wireless signal at each of the scanned plurality of beamforming direction settings.

5. The wireless device of claim 3, wherein the controller operating to identify the wireless connection direction comprises the controller operating to:
select a one of the plurality of beamforming direction settings of a multiple antenna array of the radio; and
receive the wireless signal from the base station through the radio and measure the one or more signal metrics of the wireless signal while the wireless device is subjected to motion over time.

6. The wireless device of claim 3, wherein the controller further operates to generate a signal metric map or a probability map, wherein the signal metric map or the probability map is generated based on sensed motion of the wireless device and the one or more measured signal metrics.

7. The wireless device of claim 6, wherein the signal metric map includes relationships between directions of the wireless device and the measured signal metrics.

8. The wireless device of claim 7, further comprising the controller operating to associate a time with the one or more measured signal metrics.

9. The wireless device of claim 6, wherein the probability map includes estimated probabilities of the wireless connection direction for establishing a wireless connection to the base station in given directions.

10. The wireless device of claim 6, further comprising the controller operating to track a duration of time over in which the one or more measured signal metrics are sensed.

11. The wireless device of claim 10, further comprising the controller operating to generate the estimated probabilities of the probability map based on the time associated with the one or more measured signal metrics, or the tracked duration of time associated with the one or more measured signal metrics.

12. The wireless device of claim 6, wherein the signal map or the probability map is generated further based on the spatial relationships between each of different beamforming directions of the plurality of beamforming direction settings and the one or more measured signal metrics for the plurality of beamforming direction settings.

13. The wireless device of claim 12, further comprising the controller operating to select the one of the plurality of beamforming direction settings for communicating with the base station based on the wireless connection direction, the one of the plurality of beamforming settings that corresponds with the wireless connection direction, and the sensed motion of the wireless device further comprises referencing the signal map or the probability map.

14. The wireless device of claim 3, wherein a frequency for reselecting a one of the plurality of beamforming settings for communicating with the base station is based on an angular velocity of the wireless device.

15. The wireless device of claim 3, wherein a timing for reselecting a one of the plurality of beamforming settings for communicating with the base station is synchronized with a sleep cycle of receive and transmit chains of the wireless device.

16. The wireless device of claim 3, wherein the received wireless signal is adjusted or filtered.

17. The wireless device of claim 3, wherein the sensed motion is adjusted or corrected based on the received wireless signal.

18. The wireless device of claim 3, wherein the identified wireless connection direction for establishing the wireless connection with the base station is through a first satellite, and further comprising identifying a second wireless connection for establishing a second wireless connection with a second satellite.

19. The wireless device of claim 3, wherein the controller further operates to:
coordinate switching between selecting the one of the plurality of beamforming direction settings for communicating with the base station based on the wireless connection direction, and select the one of the plurality of beamforming direction settings for receiving wireless signals from the second satellite based on the second wireless connection direction, wherein the coordinated switching is based on a sleep cycle of the wireless device.

20. The wireless device of claim 3, wherein the selecting the one of the plurality of beamforming direction settings for communicating with the base station is further based on sensed magnetic fields of a magnetometer.

\* \* \* \* \*